Nov. 8, 1949          A. C. HUGIN          2,487,551
DYNAMOELECTRIC MACHINE
Filed July 28, 1947          2 Sheets-Sheet 1
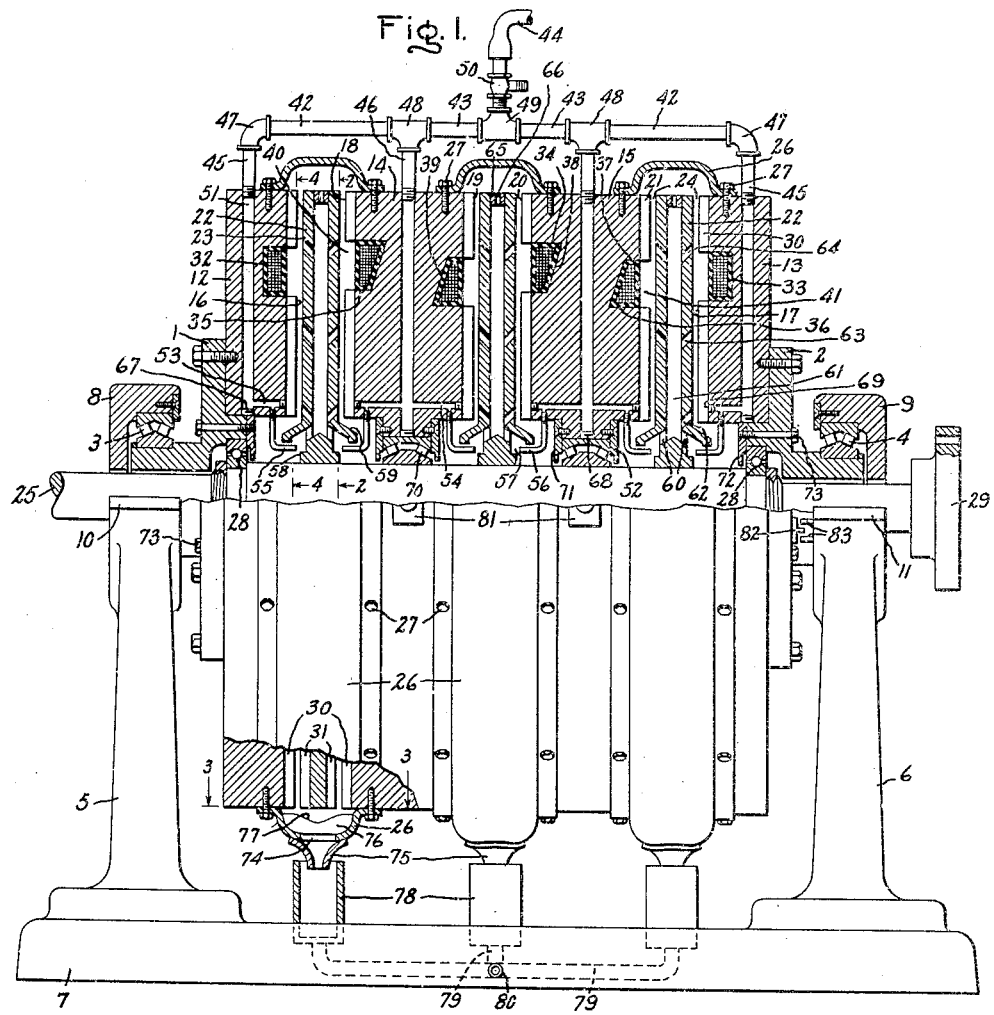
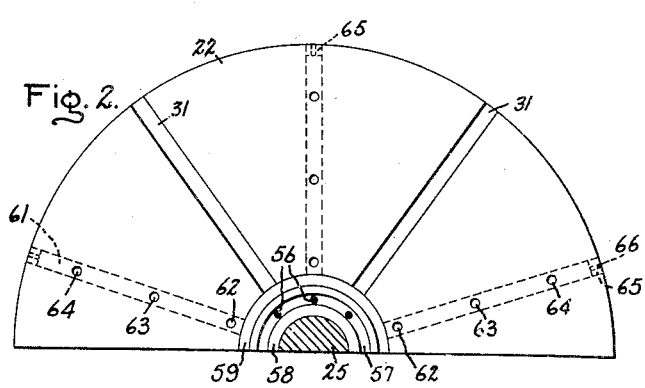
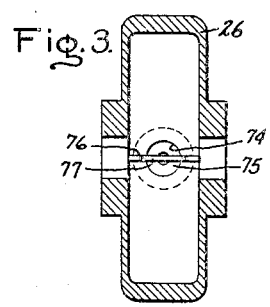
Inventor:
Adolph C. Hugin Nov. 8, 1949     A. C. HUGIN     2,487,551
DYNAMOELECTRIC MACHINE
Filed July 28, 1947     2 Sheets-Sheet 2
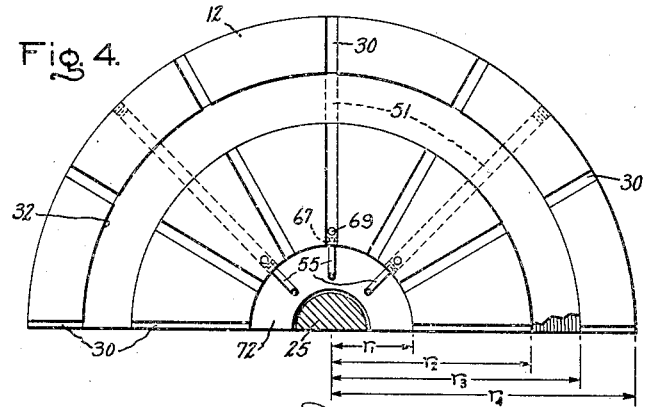
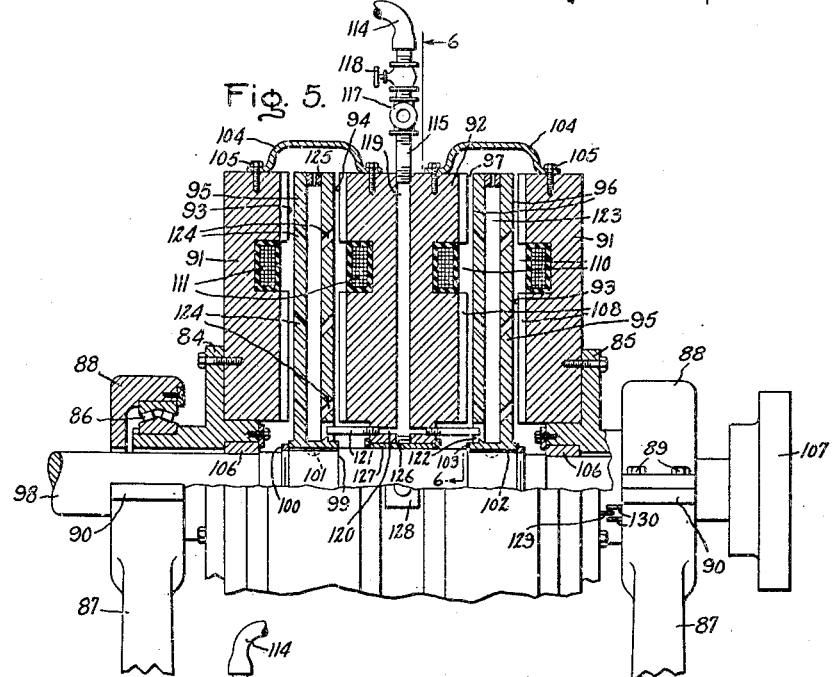
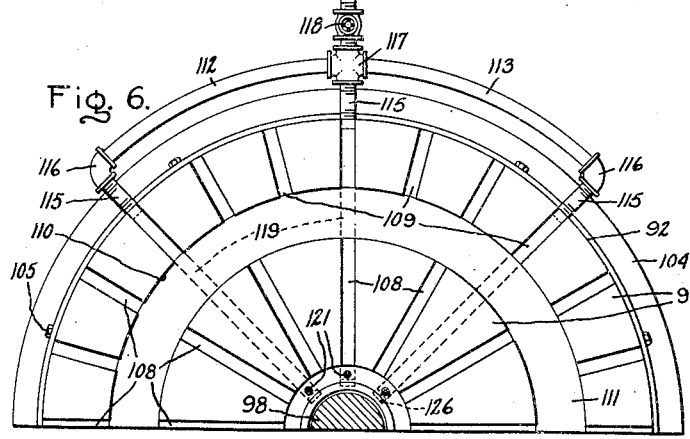
Inventor:
Adolph C. Hugin Patented Nov. 8, 1949

2,487,551

UNITED STATES PATENT OFFICE 2,487,551

DYNAMOELECTRIC MACHINE

Adolph C. Hugin, Arlington, Mass.

Application July 28, 1947, Serial No. 764,182

15 Claims. (Cl. 172—285)

1

My invention relates to dynamoelectric machines and particularly to eddy current inductor type machines which are adaptable for use as clutches, dynamometers, brakes, or similar equipment.

An object of my invention is to provide an improved dynamoelectric machine of the inductor type.

Another object of my invention is to provide an inductor dynamoelectric machine with an improved cooling system.

A further object of my invention is to provide an improved dynamoelectric machine of the inductor type particularly adaptable to mass production by the provision of similar units which may be readily assembled in multiple to provide the desired capacity to a machine.

A still further object of my invention is to provide a dynamoelectric machine of the inductor type having an improved magnetic system for more effectively and efficiently utilizing the material of which the machine is built.

Further objects and advantages of my invention will become apparent and my invention will be better understood from the following description referring to the accompanying drawings, and the features of novelty which characterize my invention will be pointed out with particularity in the claims annexed to and forming part of this specification.

In the drawings, Fig. 1 is a side elevational view, partly in section, illustrating an embodiment of my invention; Fig. 2 is a sectional view taken along line 2—2 of Fig. 1; Fig. 3 is a sectional view taken along line 3—3 of Fig. 1; Fig. 4 is a sectional view taken along line 4—4 of Fig. 1; Fig. 5 is a side elevational view, partly in section, of a modification of my invention shown in Figs. 1 to 4 with a part of the machine broken away; and Fig. 6 is a sectional view taken along the broken line 6—6 through an air gap of the machine shown in Fig. 5.

Referring to Figs. 1 to 4 of the drawings, I have shown one embodiment of my invention applied to a dynamoelectric machine of the inductor eddy current type particularly constructed for use as a dynamometer or a brake. In this construction, the dynamoelectric machine is provided with two relatively rotatable members, one of which is mounted as a relatively stationary member and is supported by end bearing housing frames 1 and 2 which are rotatably supported by any suitable bearings, such as antifriction roller bearings 3 and 4 mounted in pedestals 5 and 6 which form part of the main supporting base 7 of the machine. The pedestals 5 and 6 are preferably formed with upper portions which provide for the ready assembly and disassembly of the supporting bearings and are, therefore, preferably made as removable bearing housing caps 8 and 9 secured to the lower portions of the pedestals in any suitable manner, as by through bolts extending into flanges 10 and 11 of the pedestals 5 and 6. The bearings 3 and 4 preferably are formed as double tapered roller bearings to provide for the absorption of end thrust which may be transmitted thereto by the relatively stationary member of the machine. In the construction of my improved machine illustrated in the drawings, the end thrust of the machine is adapted to be neutralized by the electromagnetic arrangement such that under normal operating conditions substantially no end thrust should be transmitted to the bearings which are arranged to support the stationary member of the machine.

The relatively stationary member of the machine is formed with a pair of axially spaced end core members 12 and 13 and may be provided with one or more intermediate core members as shown at 14 and 15 in Fig. 1. These core members all are formed of magnetic material with substantially radial faces 16 and 17 on the end members 12 and 13, and 18 and 19, and 20 and 21 on the intermediate members 14 and 15, respectively. The stationary core members are arranged to provide pairs of axially spaced radial faces on adjacent stationary core members, between each pair of which a core member of the main rotatable member is arranged.

When the capacity of the machine is such that it is desirable to provide a plurality of pairs of axially spaced stationary core faces, such as that shown in Fig. 1, the main rotatable member of the machine is provided with a plurality of similar core members 22 of magnetic material arranged one intermediate each pair of axially spaced radial faces of adjacent stationary core members. These rotatable core members 22 are formed with substantially radial faces 23 on each side thereof which are axially spaced from adjacent stationary core member faces by relatively small air gaps, indicated at 24. The rotatable core members 22 are rigidly mounted on a suitable shaft 25 and may be secured thereto in any suitable manner, as by a press fit.

In assembling the machine, the rotatable core members may be secured to the shaft 25 with the desired spacing on each side of the intermediate stationary core members, and the air gaps between the rotatable and stationary members may be more accurately adjusted by securing together the stationary core members through housing members 26 secured to adjacent stationary core members in axially adjustable relation by bolts 27 extending through axially elongated openings in the housing members. This provides for slight axial adjustments of the stationary core members, and, if desired, the air gaps may be checked through suitable peep holes in the housings 26 with suitable removable covers. Suitable bearings 28, preferably of the antifriction type, are mounted in each of the stationary supporting end frames 1 and 2 for rotatably supporting the rotatable member shaft 25, and a suitable coupling 29 may be secured to either or both ends of the shaft 25 for connection to an external shaft.

In this type machine, it is desirable that the energy which is to be absorbed when the machine is utilized as a brake or dynamometer shall be generated as eddy currents in either or both the stationary or rotatable members of the machine, and that the heat produced by these eddy currents be dissipated as quickly as possible to utilize the material in the machine most efficiently and to prevent overheating of the machine. In the embodiment of my invention illustrated in the drawings, the eddy currents are adapted to be generated in both the rotatable and stationary members in the larger surfaces of both of these members, thereby utilizing the material of these members to maximum capacity.

The magnetic excitation of the machine may be provided in any suitable manner, as by electromagnetic field exciting windings mounted in the machine to provide a substantially torric magnetic field linking the stationary and rotatable core members. The material of the core members of the machine is most effectively utilized by providing for substantially uniform magnetic density in the surfaces of the radial core faces. This may be obtained in my improved construction by providing a substantially circular field exciting winding recess in each of the stationary core members and arranging a field exciting winding in these winding recesses which is adapted to be electrically energized in any suitable manner. The substantially uniform saturation of the radial core faces is obtained by arranging the field exciting winding recess in such a position as to divide the stationary member faces into two substantially equal areas radially spaced apart. As shown more specifically in Fig. 4, this may be done by making the radius $r_1$ of the inner edge of the stationary core members and the radii $r_2$ and $r_3$, which define the inner and outer sides of the winding recess, and the radius $r_4$ which determines the outer peripheral edge of the stationary core member, such that the area between the circles drawn at the radii $r_1$ and $r_2$ is substantially equal to the area between the circles drawn at the radii $r_3$ and $r_4$; in other words, such that $r_4^2 - r_3^2 = r_2^2 - r_1^2$.

In order to generate eddy currents in the radial faces of the stationary and rotatable members, it is necessary that magnetic flux variations or pulsations link these surfaces, and this may readily be obtained by providing teeth in these radial faces. In this manner, rotation of the rotatable core members 22 provides flux variations in the radial faces of the member spaced from the toothed face. As shown in this embodiment of my invention, a plurality of outwardly extending substantially radial slots 30 are formed in the stationary core member faces. These slots also preferably are substantially equally angularly spaced apart, and the number of these slots which are provided may be made such as to obtain the desired flux density or saturation in the core material between the slots which form the magnetic exciting teeth. The material of the machine is adapted to be utilized still more effectively by providing a plurality of outwardly extending substantially equally angularly spaced slots 31 in the radial faces of the rotatable core members 22, but the number of these slots is considerably less than the slots in the stationary member, so that a larger amount of the radial faces of the rotatable core members is available for the generation of eddy currents therein than in the stationary core member faces, as cooling of the rotatable core members can be more effectively obtained than cooling of the stationary core members because of the rotation thereof.

In such an inductor type machine, it is desirable to provide for as large as possible a range of smooth torque absorption through as large as possible a range of speed. This is facilitated by minimizing erratic action and torque pulsations which may be produced by the forces acting on the stationary and rotatable members of the machine. Any tendency of the stationary and rotatable members to lock in any given position would tend to produce undesirable torque pulsations, and this is minimized in the illustrated construction by forming the slots 31 in the rotatable core members different in number from and axially spaced an uneven multiple of the annular spacing of the stationary core face slots 30, such that not more than one of the rotatable member core slots 31 can at any time become aligned with a stationary core member slot 30.

The magnetic excitation of the machine may be obtained in any suitable manner and is preferably provided by a field exciting winding which includes a plurality of exciting winding coils arranged in field exciting winding recesses in the stationary core members. For the most effective use of the radial faces of the stationary core members, the field exciting winding recesses are formed with inner and outer sides on the radii $r_2$ and $r_3$, as shown in Fig. 4, and the field exciting winding recesses 32 and 33 in the stationary end core members 12 and 13, respectively, are formed in this manner and are substantially ring-shaped and of a substantially uniform depth. Similar field exciting winding recesses and field exciting winding coils are formed in the intermediate stationary core members 14 and 15 when such intermediate core members are provided. The maximum efficient capacity of such a machine will be limited by the minimum section of core of the stationary core member due to saturation of the minimum section of such core member. The main core section in each case is the portion of the core directly adjacent the base of the field exciting winding recesses. In the end members 12 and 13, this section may be made of such a dimension as to provide the desired saturation to the teeth between the slots 30 without saturation of the core section behind the base of the winding recess. The provision of such a depth to the core section between the winding recesses in the intermediate stationary core members may result in unduly increasing the depth of these stationary core members and thereby increasing the overall length of the machine. As shown in Fig. 1, the overall length of the machine may be decreased by increasing the effective section between the field exciting winding recesses in the intermediate members. This is obtained by forming the field exciting winding recesses in both faces of the intermediate stationary core members with substantially circular inner and outer radially spaced sides 34 and 35 and 36 and 37 and with bases 38 and 39 which extend annularly to the plane of the faces of the intermediate core member, such that a section through the intermediate core member provides substantially parallel bases to the two winding recesses with the wider side 34 of the winding recess 40 nearer the outer periphery of the core and the wider side 36 of the winding recess 41 nearer the axis of the core. This is further improved by displacing the winding recess 40 radially nearer the outer periphery of the core than the most desirable position, as indicated by the radii in Fig. 4 and the winding recesses in the end core members, and with the other winding recess 41 with the wider side 32 thereof nearer the axis of the machine displaced nearer the axis of the core than the most desirable location, as indicated by Fig. 4. This provides a relatively large magnetic material section between the intermediate core member recesses 40 and 41 which may be made with substantially the same winding recess cross-sectional area as that of the winding recesses in the stationary end core members. With such an arrangement of the intermediate core member recesses, the larger number of field exciting winding coil turns is arranged nearer the smaller face section of each of the faces, thereby minimizing the effect of the loss due to flux leakage between the turns of the coil and the core.

In order more effectively to utilize the material in this type machine, it is desirable that the heat generated by the eddy currents in the faces of the stationary and rotatable members be dissipated as rapidly as possible to provide for maximum absorption of the energy transmitted to the machine. This may be effectively obtained by cooling the machine through direct contact of the surfaces in which eddy currents are generated by a suitable cooling fluid. In addition, cooling fluid may be passed through the core members and further assist in removing a portion of the heat generated by eddy currents by direct flow through these members. In the construction shown in Figs. 1 through 4, this is obtained by supplying a suitable cooling fluid, such as water, into the stationary member of the machine through a header system including connecting pipe sections 42 and 43, to which water is supplied through a flexible connection 44, such as a rubber hosing, which is connected to a suitable source of cooling fluid supply. These connecting pipe sections 42 and 43 are connected to nipples 45 and 46 through L's 47 and T's 48, respectively. The connecting pipe sections 43 are connected to the flexible connection 44 through a suitable T 49 and a regulating valve 50. This valve 50 may be of the electromagnetic type which is adapated to vary the flow of cooling fluid in accordance with the temperature of the cooling fluid which is exhausted from the machine, such that if this temperature exceeds a predetermined maximum value, the electromagnetic valve 50 permits a greater flow of cooling fluid, and if the exhaust temperature of the cooling fluid falls below a predetermined value, the electromagnetic valve 50 tends to restrict the flow of cooling fluid. The control circuit for this valve 50 may be any suitable thermostatic control of conventional arrangement and, therefore, is not illustrated in order not to complicate the drawing with a well known feature. This control of the amount of cooling fluid passing through the machine assures the most efficient utilization of cooling fluid so as to prevent overheating of the machine and also to prevent a wasteful flow of excess cooling fluid through the machine.

The cooling fluid is admitted into the interior of the machine from the supply nipples 45 and 46 and flows into radially extending cooling fluid passages 51 and 52 in the end and intermediate stationary core members, respectively. These radially extending cooling fluid passages 51 and 52 communicate with axially extending cooling fluid passages 53 and 54, through which the cooling fluid flows into cooling fluid supply tubes 55 and 56, respectively, secured to the stationary member cores. The cooling fluid is supplied to the rotatable member cores 22 from the tubes 55 and 56 by passing from these tubes into cooling fluid troughs 57 which extend between inner and outer annular lips 58 and 59, and the troughs 57 communicate by a plurality of substantially equally angularly spaced angularly extending passages 60 which communicate with a plurality of outwardly extending substantially radial passages 61 spaced substantially equally angularly around the periphery of the rotatable member core and extending through substantially the central axial parts of these members. The outwardly extending cooling fluid passages 61 preferably are arranged equally angularly between the slots 31 and communicate with the air gaps between the rotatable and stationary members through a plurality of angularly outwardly extending passages 62, 63, and 64 on each side thereof, such that rotation of the rotatable member cores 22 causes cooling fluid to be pumped under centrifugal force through the passages 61 and to flow outwardly through the passages 62, 63, and 64 in an outward direction into contact with the radial eddy current faces of the stationary member cores. In this manner, the cooling fluid is sprayed in a relatively thin film over the entire surfaces of the stationary member cores and is also splashed back over the eddy current surfaces of the rotatable member cores. In addition, the cooling fluid passes over the outer surfaces of the field exciting winding coils and thereby also removes the heat generated by the exciting current in these coils.

Rotation of the rotatable member cores imparts to the cooling fluid, which is pumped through the cooling fluid passages in these cores, an outwardly directed force which causes the cooling fluid to pass radially outwardly from the air gaps between the rotatable and stationary member cores into the space around the rotatable member core on the outside of the air gaps within the housing 26. These housings 26 form cooling fluid collecting scrolls such that cooling fluid passing into these housings will collect in the lower portion of the machine, from which it is adapted to be drained. The radially extending cooling fluid passages 61 may be most effectively utilized as direct cooling channels by restricting the openings in the ends of these passages by the insertion therein of plugs 65 which are each formed with a restricted orifice 66 therethrough to limit the amount of cooling fluid which passes directly into the collecting housings 26.

In order to facilitate the manufacture of the stationary member cores, the cooling fluid passages 51 and 52 are adapted to be drilled completely through the core members and the inner ends of the passages 51 and 52 are adapted to be closed off by suitable threaded pipe plugs 67 and 68, respectively. The cooling fluid passages 53 may be drilled through from the inner sides of the cores, and the inner ends of these passages also may be blocked by suitable threaded pipe plugs 69 screwed into the ends thereof.

In this construction, the intermediate stationary core members 14 and 15 are rotatably mounted about the rotatable member shaft 25 on suitable bearings, such as antifriction roller bearings 70, preferably of the sealed type, and labyrinth sealing rings 71 are arranged on each side of these bearings and secured to the stationary member cores to prevent the passage of cooling fluid into these bearings. Other suitable labyrinth sealing rings 72 are secured by bolts 73 to the end bearing housing frames 1 and 2 to prevent the passage of cooling fluid into the bearings 28, and these rings also form bearing race retaining members for the outer races of the antifriction bearings 28.

The cooling fluid which passes out of the air gaps of the machine into the collecting troughs formed by the housings 26 collects in the lower portion of these housings and is adapted to be drained therefrom through openings 74 formed in the lower sides thereof and through funnel-shaped drains 75 secured to the housings 26 over the openings 74. In order to minimize hydraulic drag and thereby also minimize any tendency towards erratic action by flooding of the machine, I provide a transversely extending baffle 76 in the lower part of each of the housings 26 arranged over substantially the center of each drain opening 74, such that any cooling fluid which tends to circulate around the collecting trough will impinge against the baffle 76 and be deflected downwardly and outwardly through the drain 75. This provides for the absorption of the tangential component of force in the cooling fluid and provides for its exhaust radially from the machine, thus providing for an accurate measurement of the energy absorbed by the machine. The upper surface 77 of the baffle 76 is preferably formed with a slight depression near the center portion directly over the rotatable member core to permit a certain amount of cooling fluid to spill over this portion of the baffle and to prevent a direct hydraulic drag on the rotatable member core. The cooling fluid which is exhausted through the drains 75 is collected in small collecting sumps 78 which are connected by suitable drain pipes 79 to a drain connection 80.

When this type machine is utilized as a dynamometer, weighing balance arms are adapted to be connected to the stationary member through lugs 81, as in any conventional equipment of this type. In addition, in this type machine, the rotation of the relatively stationary member is limited to a predetermined angular displacement by a suitable set of stops which may include a stop 82 secured to the end bearing housing frame 2 and a pair of spaced apart stops 83 mounted on the pedestal 6.

This construction provides an arrangement whereby cooling fluid is utilized to absorb the heat generated in the eddy current surfaces of the machine by direct contact with the eddy current surfaces of both the stationary and rotatable members of the machine and also by passage of the cooling fluid directly through the inductor core members in which the eddy currents are generated and provides for high accuracy of the device as a dynamometer in addition to a high efficiency and effective utilization of the material of the machine.

In Figs. 5 and 6 of the drawings, I have shown another embodiment of my invention applied to a dynamoelectric machine of the inductor eddy current type similar to that shown in Figs. 1 to 4. In this construction, the dynamoelectric machine is provided with two relatively rotatable members having simplified structural features which can also readily be utilized in a construction such as that shown in Fig. 1. These features particularly include an improved cooling system and improved mountings which facilitate assembly and repairs of the machine. One of the two relatively rotatable members of the machine is mounted as a main relatively stationary member and is supported by end bearing housing frames 84 and 85 which are rotatably supported by any suitable bearings, such as antifriction roller bearings 86 mounted in pedestals 87 which form part of the main support for the machine. These pedestals 87 are preferably formed with upper portions which provide for the ready assembly and disassembly of the supporting bearings and are, therefore, preferably made as removable bearing housing caps 88 secured to the lower portions of the pedestals in any suitable manner, as by through bolts 89 extending into flanges 90 of the pedestals 87. The bearings 86 preferably are formed as double tapered roller bearings to provide for the absorption of end thrust which may be transmitted thereto by the relatively stationary member of the machine. In this construction, as in that shown in Fig. 1, the end thrust of the machine is adapted to be neutralized by the electromagnetic arrangement such that under normal operating conditions substantially no end thrust should be transmitted to the bearings which are arranged to support the stationary member of the machine.

The relatively stationary member of the machine is formed with a pair of axially spaced end core members 91 and may be provided with one or more intermediate core members, as shown at 92. These core members all are formed of magnetic material with substantially radial faces 93 on the end members 91 and faces 94 on the intermediate member 92, respectively. The stationary core members are arranged to provide pairs of axially spaced radial faces on adjacent stationary core members between each pair of which a core member of the main rotatable member is arranged.

When the capacity of the machine is such that it is desirable to provide a plurality of pairs of axially spaced stationary core faces, the main rotatable member of the machine is provided with a plurality of similar core members 95 of magnetic material arranged one intermediate each pair of axially spaced radial faces of adjacent stationary core members. These rotatable core members 95 are formed with substantially radial faces 96 on each side thereof which are axially spaced from adjacent stationary core member faces by relatively small air gaps, indicated at 97. The rotatable core members 95 are rigidly mounted on a suitable shaft 98 and may be secured thereto in any suitable manner. To facilitate assembly and repairs, the shaft 98 is formed with shoulders 99 against which the rotatable core members 95 are secured axially by nuts 100 which threadedly engage the shaft 98, and keys 101 engage keyways 102 in hubs 103 of the cores 95 and keyways in the shaft 98 to secure the cores against relative rotational displacement on the shaft.

Each rotatable core member and its pair of cooperating stationary core members can be designed for a predetermined maximum capacity, and machines of multiples of such standard capacity can be made by assembling the desired multiple number of sets of cores on a suitable shaft formed with stepped shoulders and threaded portions for mounting the sets of cores. This construction provides for ready disassembly from either end for repairs of damaged coils or other parts without special drawing tools or presses. In assembling the machine, the rotatable core members 95 may be secured to the shaft 98 with the desired spacing on each side of the intermediate stationary core member 92, and the air gaps 97 may be adjusted to the desired width by varying the spacing between adjacent stationary core members. This adjustment may be obtained by securing together these stationary core members by housing members 104 fastened in axially adjustable relationship by suitable means, such as bolts 105, extending through slightly elongated openings in the housings 104. Suitable bearings 106, preferably of the journal type, of synthetic resin or special alloys suitable for water lubrication or no lubrication are mounted in each of the stationary supporting end frames 84 and 85 for rotatably supporting the rotatable member shaft 98, and a suitable coupling 107 may be secured to either or both ends of the shaft 98 for connection to an external shaft.

As in the type machine shown in Fig. 1, it is desirable that the energy which is to be absorbed by the generation of eddy currents in either or both the stationary or rotatable members of the machine and transformed into heat be dissipated as quickly as possible to utilize the material in the machine most efficiently and to prevent overheating of the machine. In this embodiment of my invention, the eddy currents are adapted to be generated in both the rotatable and stationary members in the larger surfaces of both of these members, thereby utilizing the material of these members to maximum capacity.

The magnetic excitation of the machine may be provided in any suitable manner, as by electromagnetic field exciting windings mounted in the machine to provide a substantially torric magnetic field linking the stationary and rotatable core members. The material of the core members of the machine is most effectively utilized by providing for substantially uniform magnetic density in the surfaces of the radial core faces. This may be obtained in my improved construction by providing a substantially circular field exciting winding recess in each of the stationary core members and arranging a field exciting winding in these winding recesses which is adapted to be electrically energized in any suitable manner. The substantially uniform saturation of the radial core faces is obtained by arranging the field exciting winding recess in a position so as to divide the stationary member faces into two substantially equal areas radially spaced apart in substantially the same manner as explained with reference to Figs. 1 and 4. Magnetic flux variations or pulsations link the faces of the stationary and rotatable members by providing teeth in these radial faces such that rotation of the rotatable core members 95 provides flux variations in the radial faces of the member spaced from the toothed face. The desired teeth are formed in the stationary core members by providing a plurality of outwardly extending substantial radial slots 108 in the stationary core member faces. These slots also preferably are substantially equally angularly spaced apart, and the number of these slots may be made such as to obtain the desired flux density or saturation in the core material between the slots which form the magnetic exciting teeth. Since the radial slots 108 are relatively much further apart near the outer periphery of the core than at the inner portion, increased capacity and efficiency may be obtained by providing a plurality of relatively short outwardly extending substantially radial slots 109 arranged intermediate the slots 108 and spaced substantially equally angularly from each other and the slots 108. These additional slots preferably extend from the outer periphery of the core to a point inwardly where it provides for efficient magnetic flux saturation, usually to the outside of an exciting winding recess 110. The material of the machine is adapted to be utilized still more effectively by providing a plurality of outwardly extending substantially equally angularly spaced slots in the radial faces of the rotatable core members 95, similar to slots 31 in Figs. 1 and 2, for the generation of eddy currents in the stationary core faces by magnetic flux variations therein or rotation of the rotatable core members, but the number of these slots preferably is considerably less than the slots in the stationary member, so that a larger amount of the radial faces of the rotatable core members is available for the generation of eddy currents therein than in the stationary core member faces, as cooling of the rotatable core members can be more effectively obtained than cooling of the stationary core members because of the rotation of the rotatable member. In order to improve smooth operation of the machine, the slots in the rotatable core members are different in number from and axially spaced an uneven multiple of the annular spacing of the stationary core face slots 108, such that not more than one of the rotatable member core slots can at any time become aligned with a stationary core member slot 108.

The magnetic excitation of the machine may be obtained in any suitable manner and is preferably provided by a field exciting winding which includes a plurality of exciting winding coils 111 arranged in field exciting winding recesses in the stationary core members. The energization of the field exciting winding may be varied in any desired manner to control the excitation and consequently the energy absorption of the machine. For the most effective use of the radial faces of the stationary core members, the field exciting winding recesses are formed as explained with reference to Fig. 4 and may include uniform depth recesses 110 as shown in Figs. 5 and 6 or variations as shown in Fig. 1.

In order to dissipate as rapidly as possible heat generated in the machine, it is adapted to be cooled by direct contact of the surfaces in which eddy currents are generated by a suitable cooling fluid. In addition, cooling fluid may be passed through the core members and further assist in removing a portion of the heat generated by eddy currents by direct flow through these members. In the construction shown in Figs. 5 and 6, this is obtained by supplying a suitable cooling fluid, such as water, into the stationary member of the machine through a header system including connecting pipe sections 112 and 113, to which water is supplied through a flexible connection 114, such as a rubber hosing, which is connected to a suitable source of cooling fluid supply. These connecting pipe sections 112 and 113 are connected to nipples 115 through L's 116 and an X 117, and the latter connecting X provides a connection of the headers to the flexible connection 114 through a suitable regulating valve 118 which may be of the manual type or of the electromagnetic type adapted to vary the flow of cooling fluid in accordance with the temperature of the cooling fluid which is exhausted from the machine similar to that of Fig. 1. This control of the amount of cooling fluid passing through the machine assures the most efficient utilization of cooling fluid so as to prevent overheating of the machine and also to prevent a wasteful flow of excess cooling fluid through the machine.

The cooling fluid is admitted into the interior of the machine from the supply nipples 115 and flows into radially extending cooling fluid passages 119 in the intermediate stationary core member. These radially extending cooling fluid passages 119 communicate with axially extending cooling fluid passages 120, through which the cooling fluid flows into cooling fluid supply tubes 121 secured to the stationary member cores. The cooling fluid is supplied to the rotatable member cores 95 from the tubes 121 by passing from these tubes into cooling fluid troughs 122 which extend between inner and outer annular lips, and the troughs 122 communicate directly with a plurality of outwardly extending substantially radial passages 123 spaced substantially equally angularly around the periphery of the rotatable member core and extending through substantially the central axial parts of these members. The outwardly extending cooling fluid passages 123 preferably are arranged equally angularly between the slots and communicate with the air gaps between the rotatable and stationary members through a plurality of angularly outwardly extending passages 124 on each side thereof, such that rotation of the rotatable member cores 95 causes cooling fluid to be pumped under centrifugal force through the passages 123 and to flow outwardly through the passages 124 in an outward direction into contact with the radial eddy current faces of the stationary member cores. In this manner, the cooling fluid is sprayed in a relatively thin film over the entire surfaces of the stationary member cores and is also splashed back over the eddy current surfaces of the rotatable member cores. In addition, the cooling fluid passes over the outer surfaces of the field exciting winding coils 111 in recesses 110 and thereby also removes the heat generated by the energizing current in these coils.

Rotation of the rotatable member cores imparts to the cooling fluid, which is pumped through the cooling fluid passages in these cores, an outwardly directed force which causes the cooling fluid to pass radially outwardly from the air gaps between the rotatable and stationary member cores into the space around the rotatable member core on the outside of the air gaps within the housings 104. These housings form cooling fluid collecting scrolls such that cooling fluid passing into these housings will collect in the lower portion of the machine, from which it is adapted to be drained. The radially extending cooling fluid passages 123 may be most effectively utilized as direct cooling channels by restricting the openings in the ends of these passages by the insertion therein of plugs 125 which are each formed with a restricted orifice therethrough to limit the amount of cooling fluid which passes directly into the collecting housings 104. The cooling fluid which passes out of the air gaps of the machine into the collecting troughs formed by the housings 104 collects in the lower portion of these housings and is adapted to be drained therefrom in any suitable manner, as in the manner shown in Fig. 1.

In order to facilitate the manufacture of the stationary member cores, the cooling fluid passages 123 are adapted to be drilled completely through the core members and the inner ends of these passages are adapted to be closed off by suitable threaded pipe plugs 126. In this construction, the intermediate stationary core member 92 is rotatably mounted about the rotatable member shaft 98 on suitable bearings, such as journal bearings 127 of suitable material which may be water lubricated or require no lubrication, as a synthetic resin or suitable alloy bearing.

When this type machine is utilized as a dynamometer, a weighing balance arm is adapted to be connected to the stationary member through a lug 128, as in any conventional equipment of this type. In addition, in this type machine, the rotation of the relatively stationary member is limited to a predetermined angular displacement by a suitable set of stops which may include a stop 129 secured to the end bearing housing frame 85 and a pair of spaced apart stops 130 mounted on the pedestal 87.

This construction provides an arrangement whereby cooling fluid is utilized to absorb the heat generated in the eddy current surfaces of the machine by direct contact with the eddy current surfaces of both the stationary and rotatable members of the machine and also by passage of the cooling fluid directly through the inductor core members in which the eddy currents are generated and provides for high accuracy of the device as a dynamometer in addition to a high efficiency and effective utlization of the material of the machine. In addition, the simplified cooling and bearing arrangements provide a very practical construction adapted to production standards whereby multiples of unit capacity may easily be obtained by merely adding more sets of cores to the main stationary and rotatable members.

While I have illustrated and described particular embodiments of my invention, modifications which are within the spirit and scope of my invention may occur to those skilled in the art. I desire it to be understood, therefore, that all such modifications are included in the scope of the claims annexed to and forming a part of this specification.

What I claim as new and desire to secure by Letters Patent of the United States is:

1. A dynamoelectric machine having a pair of main relatively rotatable members having cores of magnetic material spaced with radially extending air gaps therebetween, means for magnetically exciting said relatively rotatable core members, a plurality of outwardly extending slots in the air gap surfaces of one of said main members, a plurality of slots in the air gap surfaces of the other of said main members different in number from the slots in said one member and not an even multiple thereof, cooling means including an inwardly extending passage in one of said main members connected to a source of cooling fluid supply and a plurality of outwardly extending passages in the other of said main members arranged to be supplied with cooling fluid from said passage in said one member and communicating with said air gaps for supplying cooling fluid into said air gaps into direct contact with said air gap surfaces of said main members for cooling said members, and means for draining cooling fluid from said machine.

2. A dynamoelectric machine including a relatively stationary member having two end and at least one intermediate axially spaced apart core members of magnetic material formed with radial faces and a plurality of outwardly extending teeth in the adjacent radial faces thereof, both radial faces of the intermediate of said stationary core members being provided with said teeth and forming active magnetic exciting and eddy current faces, a rotatable member having a core member of magnetic material with radial faces arranged between each adjacent pair of said stationary core members, a plurality of outwardly extending slots in each of said rotatable core member radial faces, means including a field exciting winding for magnetically exciting said stationary and rotatable members, outwardly extending passages through said rotatable core members with communicating passages extending therefrom to the adjacent outer radial faces of said rotatable core members, and means for supplying cooling fluid to said rotatable member passages for flow therethrough into contact with the faces of said rotatable and stationary core members for cooling said members by direct contact therewith and by flow through said rotatable member passages and slots.

3. A dynamoelectric machine including a relatively stationary member having a pair of core members of magnetic material and having radial faces, a rotatable member having a core of magnetic material with radial faces arranged between said stationary core members with an air gap between said stationary core member and the adjacent rotatable core member radial faces, one of said members being formed with a plurality of outwardly extending teeth in the radial faces thereof, a substantially circular winding recess in each radial face of said stationary member arranged for dividing each of said stationary member radial faces into two substantially equal areas radially spaced apart, means including a substantially circular field exciting winding arranged in said winding recess for magnetically exciting said stationary and rotatable members, outwardly extending passages through said rotatable member communicating with said air gaps, and means for supplying cooling fluid to said rotatable member passages for flow therethrough into said air gaps into contact with the faces of said stationary and rotatable members for cooling said members by direct contact therewith.

4. A dynamoelectric machine including a main relatively stationary member having two end and at least one intermediate axially spaced core members formed of magnetic material and having substantially radial faces providing pairs of axially spaced substantially radial faces on adjacent stationary core members, both radial faces of the intermediate of said stationary core members being arranged and forming active magnetic exciting and eddy current faces, a main rotatable member having a plurality of core members of magnetic material arranged one intermediate each of said pairs of axially spaced radial faces of adjacent stationary core members and having substantially radial faces adjacent thereto with an air gap between said stationary core member and the adjacent rotatable core member radial faces, a plurality of outwardly extending slots in said faces of at least one of said main members, means for magnetically exciting said stationary and rotatable core members, and means including a housing extending from adjacent stationary core members over each of said rotatable core members and communicating with the outer peripheral ends of the air gaps for forming a unitary structure of said stationary core members.

5. A dynamoelectric machine including a relatively stationary main member having a pair of core members with radial faces and formed of magnetic material, a main rotatable member having a core of magnetic material with radial faces arranged between said stationary core members with an air gap between said stationary core member faces and the adjacent rotatable core member radial faces, one of said main members being formed with a plurality of outwardly extending teeth in the radial faces thereof, means including a field exciting winding for magnetically exciting said stationary and rotatable core members, outwardly extending passages through said rotatable member core communicating with said air gaps, a radially extending cooling fluid passage through the interior of at least one of said stationary member cores, and means for supplying cooling fluid through said stationary core member cooling fluid passage into said rotatable member passages for flow into said air gaps into contact with the faces of said stationary and rotatable members for cooling said members by direct contact therewith and by flow through said rotatable member.

6. A dynamoelectric machine including a relatively stationary member having a pair of axially spaced apart core members with radial faces and formed of magnetic material, a rotatable member having a core of magnetic material with radial faces arranged between said stationary core members, a plurality of outwardly extending teeth in the adjacent inner radial faces of said stationary member, means including a substantially circular field exciting winding for magnetically exciting said stationary and rotatable members arranged to divide each of the radial faces of said stationary member into two substantially equal radially spaced apart areas, means for supporting said stationary member for limited rotary movement, means for rotatably supporting said rotatable member, outwardly extending passages through said rotatable member with communicating passages extending therefrom to the adjacent outer radial faces of said rotatable member, and means for supplying cooling fluid to said rotatable member passages for flow therethrough into contact with the faces of said rotatable and stationary members for cooling said members by direct contact therewith.

7. A dynamoelectric machine including a relatively stationary member having two end and at least one intermediate axially spaced apart core members of magnetic material formed with substantially radial faces and a plurality of outwardly extending slots in the adjacent radial faces thereof, both radial faces of the intermediate of said stationary core members being provided with said slots and forming active magnetic exciting and eddy current faces, a rotatable member having a plurality of core members of magnetic material with radial faces arranged between each adjacent axially spaced pair of said stationary core members, means for magnetically exciting said stationary and rotatable members, outwardly extending passages through said rotatable core members with communicating passages extending therefrom to the adjacent outer radial faces of said rotatable core members, and means including at least one inwardly extending passage in said stationary member for supplying cooling fluid to said rotatable member cooling fluid passages for flow therethrough into contact with the faces of said rotatable and stationary core members for cooling said members by direct contact therewith and by flow through said rotatable member passages.

8. A dynamoelectric machine including a relatively stationary member having a plurality of axially spaced core members with radial faces and formed of magnetic material, a rotatable member having a plurality of core members of magnetic material with radial faces arranged between said stationary core members, a plurality of outwardly extending slots in the adjacent radial faces of said stationary member, means including a substantially circular field exciting winding for magnetically exciting said stationary and rotatable members arranged to divide each of the radial faces of said stationary member into two substantially equal radially spaced apart areas, outwardly extending passages through said rotatable member with communicating passages extending therefrom to the adjacent outer radial faces of said rotatable member, and means for supplying cooling fluid to said rotatable member passages for flow therethrough into contact with the faces of said rotatable and stationary members for cooling members by direct contact therewith.

9. A dynamoelectric machine including a relatively stationary member having a plurality of axially spaced core members of magnetic material having radial faces, a rotatable member having a core of magnetic material with radial faces arranged between said stationary core members with an air gap between said stationary core member and the adjacent rotatable core member radial faces, one of said members being formed with a plurality of outwardly extending slots in the radial faces thereof, a substantially circular winding recess in each radial face of said stationary member, means including a substantially circular field exciting winding arranged in said winding recess for magnetically exciting said stationary and rotatable members, outwardly extending passages through said rotatable member communicating with said air gaps, and means including substantially radially inwardly extending passages through at least one of said stationary core members for supplying cooling fluid to said rotatable member passages for flow therethrough into said air gaps into contact with the faces of said stationary and rotatable members for cooling said members by direct contact therewith.

10. A dynamoelectric machine including a relatively stationary main member having a plurality of axially spaced core members with radial faces and formed of magnetic material, a rotatable main member having a plurality of similar core members of magnetic material with radial faces and arranged between said stationary core members with an air gap between said stationary core member faces and the adjacent rotatable core member radial faces, at least one of said main members being formed with a plurality of outwardly extending slots in the radial faces thereof, means for magnetically exciting said stationary and rotatable core members, outwardly extending passages through said rotatable member core each having a plurality of radially spaced openings communicating with said air gaps, at least one substantially radial cooling fluid passage through at least one of said stationary member cores, and means for supplying cooling fluid through said stationary member into said rotatable member passages for flow into said air gaps into contact with the faces of said stationary and rotatable members for cooling said members by direct contact therewith and by flow through said rotatable member.

11. A dynamoelectric machine including a relatively stationary member having axially spaced end and intermediate core members, all of said stationary core members being formed of magnetic material and having radial faces providing pairs of axially spaced radial faces on adjacent stationary core members, a rotatable member having a core member of magnetic material arranged intermediate each of said pairs of axially spaced radial faces of adjacent stationary core members and having radial faces adjacent thereto with an air gap between said stationary core member and the adjacent rotatable core member radial faces, a plurality of outwardly extending substantially equally angularly spaced radial slots in said faces of at least one of said members, means for magnetically exciting said stationary and rotatable core members, cooling fluid passages extending outwardly through said rotatable core members having openings communicating with said air gaps, substantially radially inwardly extending cooling fluid passages through at least one of said stationary core members, and means for supplying cooling fluid through said stationary member cooling fluid passages into said rotatable core member cooling fluid passages for flow therethrough into said air gaps into contact with the faces of said stationary and rotatable core members for cooling said members thereby and by flow through said rotatable member.

12. A dynamoelectric machine including a relatively stationary member having axially spaced end and intermediate core members, all of said stationary core members being formed of magnetic material and having radial faces providing pairs of axially spaced radial faces on adjacent stationary core members, a rotatable member having a core member of magnetic material arranged intermediate each of said pairs of axially spaced radial faces of adjacent stationary core members and having radial faces adjacent thereto with an air gap between said stationary core member and the adjacent rotatable core member radial faces, a plurality of outwardly extending substantially equally angularly spaced radial slots in said stationary member faces, means for magnetically exciting said stationary and rotatable core members, a plurality of substantially equally angularly spaced radially extending slots in each radial face of said rotatable core members different in number from and angularly spaced an uneven multiple of the angular spacing of said stationary core face slots, cooling fluid passages extending outwardly through said rotatable core members having openings communicating with said air gaps, inwardly extending cooling fluid passages through at least one of said stationary core members, means for supplying cooling fluid through said stationary member cooling fluid passages into said rotatable core member cooling fluid passages for flow therethrough into said air gaps into contact with the faces of said stationary and rotatable core members for cooling said members thereby and by flow through said rotatable member, and means including a housing secured to said stationary member and arranged over each of said rotatable core members and communicating with the outer peripheral ends of the air gaps between said rotatable and stationary core members for collecting and draining cooling fluid exhausted from said air gaps.

13. A dynamoelectric machine including a relatively stationary member having axially spaced end and intermediate core members, all of said stationary core members being formed of magnetic material and having radial faces providing pairs of axially spaced radial faces on adjacent stationary core members, a rotatable member having a core member of magnetic material arranged intermediate each of said pairs of axially spaced radial faces of adjacent stationary core members and having radial faces adjacent thereto with an air gap between said stationary core member and the adjacent rotatable core member radial faces, a substantially circular field exciting winding recess in each radial face of said stationary end core members adjacent one of said rotatable core member faces arranged for dividing each of said stationary end member radial faces into two substantially equal areas radially spaced apart, each intermediate stationary core member having a field exciting winding recess in both faces with substantially circular inner and outer radially spaced sides and with a base extending angularly to the plane of the faces of said core member such that a section through said winding recesses provides substantially parallel bases with a wider side nearer the outer periphery of the core for one recess and a wider side nearer the axis of the core for the other recess, said one recess being radially displaced nearer the outer periphery of the core and said other recess being displaced nearer the axis of the core than said winding recesses in said end core members for providing a relatively large magnetic material section between said intermediate core member recesses, a plurality of substantially equally angularly spaced outwardly extending substantially radial slots extending on both sides of each winding recess in said stationary core member faces, other substantially radial slots intermediate said first-mentioned slots in said stationary member faces and extending from each winding recess to the outer periphery of said cores, and means including a field exciting winding arranged in each of said winding recesses and conforming in general to the contours of each respective recess for magnetically exciting said stationary and rotatable core members.

14. A dynamoelectric machine including a relatively stationary member having axially spaced end and intermediate core members, all of said stationary core members being formed of magnetic material and having radial faces providing pairs of axially spaced radial faces on adjacent stationary core members, a rotatable member having a core member of magnetic material arranged intermediate each of said pairs of axially spaced radial faces of adjacent stationary core members and having radial faces adjacent thereto with an air gap between said stationary core member and the adjacent rotatable core member radial faces, a substantially circular field exciting winding recess in each of said stationary core member radial faces adjacent one of said rotatable core member faces arranged for dividing each of said stationary member radial faces into two substantially equal areas radially spaced apart, a plurality of outwardly extending substantially equally angularly spaced slots in said faces of at least one of said members, means including a field exciting winding arranged in each of said winding recesses for magnetically exciting said stationary and rotatable core members, cooling fluid passages extending outwardly through said rotatable core members having openings communicating with said air gaps, inwardly extending cooling fluid passages through said stationary member, means for supplying and regulating the flow of cooling fluid through said stationary member cooling fluid passages into said rotatable core member cooling fluid passages for flow therethrough into said air gaps into contact with said faces of said stationary and rotatable core members for cooling said members thereby, means including a housing arranged over each of said rotatable core members and communicating with the outer peripheral ends of the air gaps between said rotatable and stationary core members for collecting cooling fluid exhausted from said air gaps, and means including a drain passage through the lower portion of said housing with a baffle extending transversely across said housing over said opening for minimizing circulation of cooling fluid within said housing and draining it therefrom.

15. A dynamoelectric machine including a relatively stationary member having a pair of axially spaced end core members and an intermediate core member, all of said stationary core members being formed of magnetic material and having radial faces providing pairs of axially spaced radial faces on adjacent stationary core members, a rotatable member having a core member of magnetic material arranged intermediate each of said pairs of axially spaced radial faces of adjacent stationary core members and having radial faces adjacent thereto with an air gap between said stationary core member and the adjacent rotatable core member radial faces, a substantially circular field exciting winding recess in each radial face of said stationary end core members adjacent one of said rotatable core member faces arranged for dividing each of said stationary end member radial faces into two substantially equal areas radially spaced apart, each intermediate stationary core member having a field exciting winding recess in both faces with substantially circular inner and outer radially spaced sides and with a base extending angularly to the plane of the faces of said core member such that a section through said winding recesses provides substantially parallel bases with a wider side nearer the outer periphery of the core for one recess and a wider side nearer the axis of the core for the other recess, said one recess being radially displaced nearer the outer periphery of the core and said other recess being displaced nearer the axis of the core than said winding recesses in said end core members for providing a relatively large magnetic material section between said intermediate core member recesses, a plurality of outwardly extending substantially radial slots in said stationary member faces spaced angularly substantially equally and extending on both sides of each winding recess, other substantially radial slots intermediate said first-mentioned slots in said stationary member faces and extending from each winding recess to the outer periphery of said cores, means including an insulated field exciting winding arranged in a waterproof nonmagnetic sheath in each of said winding recesses and conforming in general to the contours of each respective recess for magnetically exciting said stationary and rotatable core members, a plurality of substantially equally angularly spaced radially extending slots in each radial face of said rotatable core members different in number from said stationary core face slots, cooling fluid passages extending outwardly through said rotatable core members arranged circumferentially intermediate said rotatable core face slots and having openings communicating with said air gaps, means for restricting the opening of said passages at the outer peripheral ends thereof, inwardly extending substantially radial cooling fluid passages through at least one of said stationary core members, means for supplying and regulating the flow of cooling fluid through said stationary core member cooling fluid passages into said rotatable core member cooling fluid passages for flow therethrough into said air gaps into contact with the faces of said stationary and rotatable core members for cooling said members thereby and by flow through said rotatable member, means including a housing secured to said stationary member and arranged over each of said rotatable core members and communicating with the outer peripheral ends of the air gaps between said rotatable and stationary core members for collecting cooling fluid exhausted from said air gaps, and means including a drain passage through the lower portion of said housing with a baffle extending transversely across said housing over said opening for minimizing circulation of cooling fluid within said housing and draining it therefrom.

ADOLPH C. HUGIN.

REFERENCES CITED

The following references are of record in the file of this patent:

UNITED STATES PATENTS

| Number | Name | Date |
|---|---|---|
| 982,789 | Bowie | Jan. 31, 1911 |
| 1,650,594 | Bing | Nov. 29, 1927 |
| 2,068,820 | Sarazin | Jan. 26, 1937 |
| 2,110,663 | Gouldthorpe | Mar. 8, 1938 |
| 2,407,504 | Martin | Sept. 10, 1946 |
| 2,453,509 | Hugin | Nov. 9, 1948 |

FOREIGN PATENTS

| Number | Country | Date |
|---|---|---|
| 243,557 | Germany | May 13, 1910 |